United States Patent
Blum et al.

(10) Patent No.: US 9,855,851 B2
(45) Date of Patent: Jan. 2, 2018

(54) ELECTRICALLY POWERED VEHICLE AND METHOD OF CHARGING AN ELECTRICAL ENERGY STORAGE DEVICE OF AN ELECTRICALLY POWERED VEHICLE

(71) Applicant: SIEMENS AKTIENGESELLSCHAFT, Munich (DE)

(72) Inventors: Manuel Blum, Ottobrunn (DE); Thomas Komma, Ottobrunn (DE); Mirjam Mantel, Munich (DE); Monika Poebl, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 146 days.

(21) Appl. No.: 14/499,477

(22) Filed: Sep. 29, 2014

(65) Prior Publication Data
US 2015/0091520 A1    Apr. 2, 2015

(30) Foreign Application Priority Data

Sep. 27, 2013    (DE) .................. 10 2013 219 528

(51) Int. Cl.
*B60L 11/18*    (2006.01)

(52) U.S. Cl.
CPC ......... *B60L 11/182* (2013.01); *B60L 11/1805* (2013.01); *B60L 11/1833* (2013.01); *B60L 2210/30* (2013.01); *B60L 2230/22* (2013.01); *B60L 2230/28* (2013.01); *B60L 2230/30* (2013.01); *Y02T 10/7005* (2013.01); *Y02T 10/7088* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC .................................................... B60L 11/182
USPC .................................................... 320/108
See application file for complete search history.

(56) References Cited

U.S. PATENT DOCUMENTS

| | | | | |
|---|---|---|---|---|
| 9,269,489 | B2 * | 2/2016 | Wu | .................... H02M 3/33576 |
| 2008/0197947 | A1 * | 8/2008 | Gevorgyan | ............. H03J 3/185 334/15 |
| 2010/0308939 | A1 * | 12/2010 | Kurs | ....................... H02J 5/005 333/219.2 |
| 2011/0193416 | A1 * | 8/2011 | Campanella | ............. H01Q 7/00 307/104 |

(Continued)

FOREIGN PATENT DOCUMENTS

| | | |
|---|---|---|
| CN | 202435057 U | 9/2012 |
| CN | 103078381 A | 5/2013 |

(Continued)

*Primary Examiner* — Drew A Dunn
*Assistant Examiner* — Jerry D Robbins
(74) *Attorney, Agent, or Firm* — Laurence A. Greenberg; Werner H. Stemer; Ralph E. Locher

(57) ABSTRACT

An electrically powered vehicle has a drive apparatus which includes an electric machine and an electrical energy storage device connected to the electric machine. A charging device is connected to the electrical energy storage device for the wireless transfer of energy by way of an alternating magnetic field. For that purpose, the charging device has an electronic coil which interacts with the alternating magnetic field. The electronic coil is connected to an adjustable compensating circuit.

9 Claims, 3 Drawing Sheets

(56) References Cited

U.S. PATENT DOCUMENTS

2011/0279226 A1 11/2011 Chen et al.
2013/0038402 A1* 2/2013 Karalis ................. H02J 5/005
333/32

FOREIGN PATENT DOCUMENTS

JP        2010233354 A   10/2010
KR    1020120016521 A    2/2012

* cited by examiner

ELECTRICALLY POWERED VEHICLE AND METHOD OF CHARGING AN ELECTRICAL ENERGY STORAGE DEVICE OF AN ELECTRICALLY POWERED VEHICLE

CROSS-REFERENCE TO RELATED APPLICATION

This application claims the priority, under 35 U.S.C. §119, of German patent application DE 10 2013 219 528.1, filed Sep. 27, 2013; the prior application is herewith incorporated by reference in its entirety.

BACKGROUND OF THE INVENTION

Field of the Invention

The present invention relates to an electrically powered vehicle having a drive apparatus which comprises an electric machine and an electrical energy storage device connected to the electric machine. A charging device is connected to the electrical energy storage device for the wireless transfer of electrical energy by way of an alternating magnetic field, for which purpose the charging device has an electronic coil which interacts with the alternating magnetic field. The invention further relates to a method for operating a charging device of an electrically powered vehicle having a drive apparatus which comprises an electric machine and an electrical energy storage device which is connected to the electric machine, wherein the charging device receives energy made available by an alternating magnetic field by means of an electronic coil which interacts with the alternating magnetic field and feeds the energy to the electrical energy storage device in the form of electrical energy. Finally, the invention relates to a computer program product comprising a program for a computer unit of a charging device.

Vehicles of the generic type with a charging device for the wireless transfer of energy by means of an alternating magnetic field are known, per se, so that no special written disclosure thereof is required. The electrically powered vehicle has the charging device so that energy can be fed to the electrically powered vehicle, said energy preferably being stored in an energy storage device of the vehicle for the purpose of carrying out the intended operation, specifically drive operation. The energy is typically provided by means of a charging station which itself is connected to an electrical energy source, for example, a public energy supply network, to an electric generator, a battery and/or the like. The charging station generates the alternating magnetic field while receiving electrical energy from the electrical energy source. The charging device of the vehicle detects the alternating magnetic field, absorbs energy therefrom and makes electrical energy available to the vehicle, particularly in order to supply the electrical energy storage device of the vehicle and/or the electric machine of the drive apparatus with electrical energy.

One possibility for feeding the energy from the charging station to the charging device of the vehicle is to form an electrical connection of an energy-transferring coupling by way of a cable between the vehicle and the charging station. According to a further possibility, it is also known to create a wireless energy-transferring coupling which avoids a complex mechanical connection by means of a cable. For this purpose, in general, provided on each of the charging station side and the vehicle side is a coil circuit, said circuits being arranged essentially opposing one another during a charging process and enabling an energy-transferring coupling, making use of an alternating magnetic field. Such an arrangement is described, for example, in Korean published patent application KR 10 2012 0 016 521 A.

In systems wherein energy is transferred by way of an alternating magnetic field, also known as inductive energy transfer, the inductances of the two coil circuits involved can be substantially changed by varying the distance and/or an offset. In known systems, this results in a substantial change in the operating frequency, that is, the frequency of the alternating magnetic field. If the parameters of the coil circuit change beyond a comparison value, this results in a lessening of the efficiency so that a pre-determined rated power level can no longer be transferred.

One possibility for being able to adapt the operating frequency is based on the use of variable capacitance diodes in order to achieve frequency tuning. A use of this type of frequency tuning in systems for inductive energy transfer, for example, for the purpose of charging an energy storage device of an electric vehicle is complex to implement. It is achievable only in a limited tuning range. Furthermore, due to the voltages arising and the power levels to be transferred during the intended operation, a complex series and parallel connection of variable capacitance diodes is necessary. In order to be able to counteract the change in the operating frequency occurring during the intended operation, a correspondingly greater circuit complexity is necessary.

Inductive energy transfer suffers from the problem that the power level transferable and the efficiency are dependent on an air gap between the charging station and the electrically powered vehicle, as well as on an offset range. With a pre-determined system design, a satisfactory operation as intended can therefore only be achieved within a small air gap range as well as a narrow load and offset range. The power transferred can only be set by means of a change in the operating frequency, although this is severely restricted due to normative limits and requirements.

SUMMARY OF THE INVENTION

It is accordingly an object of the invention to provide an electrically powered vehicle and a method for operating a charging device of the electrically powered vehicle which overcome or alleviate the disadvantages of the heretofore-known devices of this general type.

With the above and other objects in view there is provided, in accordance with the invention, an electrically powered vehicle (30), comprising:
  a drive apparatus having an electric machine and an electrical energy storage device connected to said electric machine;
  a charging device connected to said electrical energy storage device for a wireless transfer of energy by way of an alternating magnetic field, said charging device having an electronic coil configured to interact with the alternating magnetic field; and
  a settable compensating circuit connected to said electronic coil.

Inductive energy transfer and wireless energy-transferring coupling in the context of the invention is a coupling for the purpose of the transfer of energy which enables energy to be transferred at least unidirectionally from an energy source to an energy sink. The energy source can be, for example, a public energy supply network or mains, an electric generator, a solar cell, a fuel cell, a battery, combinations thereof and/or the like. The energy sink can be, for example, a drive apparatus of the electrically powered vehicle, in particular an electric machine of the drive apparatus and/or an electric energy storage device of the drive apparatus, for example, an accumulator or the like. However, a bidirectional energy transfer can also be provided, that is, energy transfer alternately in both directions. This purpose is served, inter alia, by the charging station, which is intended to transfer energy to the electrically powered vehicle, for which purpose the charging station draws electrical energy from an energy source to which it is electrically connected.

Wireless energy-transferring coupling or inductive energy transfer in the context of the invention means that no mechanical connection needs to be provided between the charging station and the electrically powered vehicle in order to establish an electrical coupling. In particular, the establishment of an electrical connection by way of a cable can be avoided. In place thereof, the energy-transferring coupling takes place purely on the basis of an energy field, preferably an alternating magnetic field.

The charging station is therefore set up to generate a corresponding energy field, in particular an alternating magnetic field. On the vehicle side, it is provided accordingly that an energy field or an alternating magnetic field of this type can be detected and energy is obtained therefrom for the intended operation of the electrically powered vehicle. By means of the charging device of the vehicle, the energy supplied by means of the energy field, in particular the alternating magnetic field is converted into electrical energy which can then preferably be stored in the energy storage device of the vehicle for the intended operation thereof. Furthermore, the energy can also be fed directly to the electric machine of the drive apparatus of the vehicle. The energy-transferring coupling therefore serves essentially for the transference of energy and not primarily the transference of information. Thus, the means for carrying out the invention are configured for a correspondingly high power throughput, in contrast to a wireless communication connection.

A primarily important element for a wireless energy-transferring coupling, in particular by means of the alternating magnetic field, is a coil circuit which comprises at least one electronic coil, possibly also a plurality of electronic coils which, on the vehicle side, are pervaded by the energy field, in particular the magnetic flux in the case of an alternating magnetic field provided as the energy field, and which supply electrical energy at the corresponding terminals thereof. Accordingly, on the charging station side, an alternating current is applied to the coil circuit, so that the coil circuit provides, by means of its coil or coils, an alternating magnetic field, by means of which energy can be output. By means of the alternating magnetic field, the coil circuit of the charging station is coupled with the coil circuit of the electrically powered vehicle during a charging process.

Typically, the coil has a winding with a plurality of windings of an electric conductor wherein the winding typically has a ferromagnetic body which is often made of, or comprises, a ferrite. By means of the ferromagnetic body, the magnetic flux can be guided in the desired manner so that the effectiveness of the energy-transferring coupling due to the alternating magnetic field between the coil circuits of the charging station and of the electrically powered vehicle can be increased.

The electrical conductor forming the windings of the electronic coil is often configured as a high-frequency litz wire, which means that it consists of a large number of individual conductors or wires which are electrically insulated relative to one another and which, accordingly are grouped together to form the conductor. It is thereby achieved that for frequency uses as per the invention, a current-displacement effect is reduced or is largely prevented. In order to achieve the most uniform possible current distribution to the individual strands of the high-frequency litz wire, twisting of the individual strands is also provided. Twisting can also include the formation of bundles from a particular number of individual wires which are twisted within each bundle, wherein said bundles forming the electrical conductors are also twisted.

An important aspect of the invention has the aim that, in a circuit arrangement of the generic type, the coil circuit and/or the compensating circuit is configured settable depending on a coupling factor of the wireless energy-transferring coupling. This can be achieved, for example, by means of a control unit which can preferably be included in the circuit arrangement. For this purpose, the at least one electronic coil of the coil circuit or the at least one passive electronic energy storage device of the compensating circuit is configured to be settable. For example, the electronic coil can be provided by a series connection of a plurality of electronic coils which can be activated when needed. Similarly, for the passive electronic energy storage device of the compensating circuit, it can be provided that said energy storage device is variably settable, for example, a mechanically settable passive electronic energy storage device. With these measures, it is possible for a finely-stepped frequency tuning to be achieved with regard to the operating frequency. Where the invention is used with an electrically powered vehicle or a charging station, finely-stepped frequency tuning of a primary-side and a secondary-side oscillating circuit of systems for inductive energy transfer can be achieved. The invention enables a corresponding adaptation to be achieved also in the case of a large distance or air gap or in the event of changes thereof and/or in the case of corresponding offset tolerances. A change in the operating frequency can be minimized thereby, so that the aforementioned disadvantages can be lessened. The invention has proved to be particularly advantageous on use of the charging of an accumulator as an energy storage device of an electrically powered vehicle at a current supply site as the charging station. The invention makes it possible, even given an unfavorable position of the vehicle in relation to the current supply site, to be able to achieve reliable operation, particularly charging operation with high efficiency and a high power level. The settability makes it possible both on the current supply site side and on the vehicle side, by means both of the coil circuit and also with the compensating circuit, to achieve adaptation of the overall system to permit reliable and highly efficient charging operation even under unfavorable boundary conditions.

A coupling factor for the wireless energy-transferring coupling can be determined, for example, by means of a suitable circuit, particularly by means of the control unit. For this purpose, the control unit can determine, for example on the charging station side, how much active power is output on the charging station side as compared with the maximum possible active power. Accordingly, it can naturally be provided on the vehicle side that an active power portion is determined in relation to a maximum possible active power portion in order to be able to determine the efficiency. Furthermore, reactive power portions can also be taken into account in both cases, provided they can be relevant for determining the efficiency. It can also be provided that, in the case of the energy-transferring coupling of the vehicle to the charging station, information, particularly in relation to the power quantities transferred and the efficiency levels, is communicated to the respective other site. In this way, total efficiency levels and possible measures for setting the coil circuit and the compensating circuit can be carried out. The compensating circuit and the coil circuit can naturally also be set purely on the basis of the values determined by them.

The coil circuit has at least one electronic coil. The coil circuit can also have a plurality of coils which are connected together, for example, in series and/or in parallel. It can thus be provided that the coil circuit has an arrangement of a plurality of spatially adjacent coils which, depending on a coupling factor, can each be activated selectively.

In particular, therefore, the invention proposes that, on the vehicle side, the electronic coil is connected to a settable compensating circuit. Settability of this type can thus naturally also be provided on the charging station side provided a suitable compensating circuit is provided there.

With these measures, it is possible to influence not only the transferable power, but also the efficiency and thus to be able to achieve a reliable charging operation of the electrically powered vehicle as intended, in particular at a suitable charging station. The influence of the air gap, the offset and the loading can always be operated, in the case of a narrow pre-determined frequency band at high, particularly maximum, power and a high efficiency level.

With the above and other objects in view there is also provided, in accordance with the invention, a method of operating a charging device of an electrically powered vehicle, the vehicle having a drive apparatus with an electric machine and an electrical energy storage device connected to the electric machine. The novel method comprises:
  receiving with the charging device energy from an alternating magnetic field by way of an electronic coil disposed to interact with the alternating magnetic field and to feed the energy to the electrical energy storage device in the form of electrical energy;
  setting the charging device with a settable compensating circuit connected to the electronic coil by the following steps:
    setting a power transferred to the charging device by the alternating magnetic field by adjusting a first adjustable capacitor of the compensating circuit connected in series with the electronic coil; and
    setting an efficiency level in relation to a power transferred by adjusting a second adjustable capacitor of the compensating circuit connected in parallel with a series connection formed of the electronic coil and the first capacitor.

In other words, from the standpoint of the method, it is therefore proposed that the charging device is set by means of a settable compensating circuit connected to the electronic coil in that the following steps are performed:
  setting a power transferred to the charging device by the alternating magnetic field by means of a first adjustable capacitor of the compensating circuit connected in series with the electronic coil, and
  setting an efficiency level in relation to the power transferred by means of a second adjustable capacitor of the compensating circuit connected in parallel with the series connection of the electronic coil and the first capacitor.

The invention enables a corresponding adaptation to be achieved also in the case of a large distance or air gap between the charging station and the electrically powered vehicle or in the event of changes thereof and/or in the case of corresponding offset tolerances. A change in the operating frequency can be minimized thereby, so that the aforementioned disadvantages can be lessened.

The invention has proved to be particularly advantageous on use of the charging of the accumulator as an energy storage device of the electrically powered vehicle at a current supply site as the charging station. The invention makes it possible, even in the event of an unfavorable position of the vehicle in relation to the current supply site, to be able to achieve reliable operation, particularly charging operation, with high efficiency and at a high power level. The settability or adjustability makes it possible, both on the current supply site side and on the vehicle side, with the compensating circuit to achieve adaptation of the overall system to permit reliable and highly efficient charging operation even under unfavorable boundary conditions. This can be achieved with the settable compensating circuit.

The coupling factor between the charging station and the electrically powered vehicle can be determined, for example, by means of a suitable circuit, in particular a control unit. Accordingly, it can be provided on the vehicle side that an active power portion is determined in relation to a maximum possible active power portion in order to be able to determine the efficiency. Furthermore, reactive power portions can naturally also be taken into account in both cases, provided they can be relevant for determining the efficiency.

The charging device has at least one electronic coil. However, the circuit can also have a plurality of electronic coils which are connected together, for example, in series and/or in parallel. It can thus be provided that the coil circuit has an arrangement of a plurality of spatially adjacent coils which, depending on the coupling factor, can each be activated either selectively or at least sometimes jointly. It is thus possible further to improve the balancing out of variations in the offset of the vehicle in relation to the charging station.

The compensating circuit can have at least one passive electronic energy storage device which is connected, for example, in series, in parallel or by a combination thereof. The passive electronic energy storage device is preferably a capacitor, for example, a foil capacitor, but also a ceramic capacitor which is preferably configured for alternating voltage operation. The compensating circuit can also have two or more passive electronic energy storage devices which can be connected in parallel or in a combination thereof. Furthermore, the possibly naturally also exists that if more than one passive electronic energy storage device is present, an electronic network is formed, for example, in the form of a fl-filter or a T-filter. Other circuit topologies can be provided. It is thereby possible to extend the range for setting the maximum power and the maximum efficiency. The energy storage device is preferably configured settable. For this purpose, the store can be formed from a plurality of individual partial energy storage devices and, where needed, activated by means of, for example, a switching element. By this means, a multiple-part passive energy storage device can be formed. Naturally, a corresponding part of the multi-part passive energy storage device can also be deactivated again by means of the associated switching element.

The switching element can be configured as described above. Preferably, the switching element is controllable, particularly by way of the control unit.

According to a further development, the switching element is formed by a semiconductor switching element or a switching unit comprising a plurality of semiconductor switching elements. A semiconductor switching element can be, as discussed above, a transistor, a thyristor or the like. The switching unit is preferably formed by at least two semiconductor switching elements which are connected in a suitable manner to achieve the intended function. For example, a parallel circuit arrangement of thyristors can be provided which are connected in parallel in opposition, with regard to the conducting direction thereof, i.e. anti-parallel. Alternatively, in place of a parallel arrangement of this type, a TRIAC can be used which enables controlled connection in both current-flow directions, as distinct from a single thyristor.

According to a further aspect of the invention, it is proposed that the compensating circuit has an adjustable capacitor which is connected in series or parallel with the electronic coil. By this means, it is possible with an economically produced component to exert an influence on the power transferred and/or the efficiency level.

It has also proved to be particularly advantageous if the compensating circuit has an adjustable first capacitor connected to the electronic coil in order to form a series circuit, and an adjustable second capacitor connected in parallel to the series circuit formed by the electronic coil and the first capacitor. By this means, it is possible to exert an influence both on the power transferred and on the efficiency of the power transfer. Thus, for example, both variables can be optimized in the desired manner so that optimum operation of the charging with the charging device can be achieved.

According to a further aspect, the vehicle has a control device for setting the compensating circuit depending on a power level transferred by means of the alternating magnetic field and/or an efficiency level of the energy transfer. The control device can thus serve, by acting on the settable compensating circuit, to be able to achieve the optimum possible, preferably pre-determined intended operation. The control device can be, for example, a constituent of the charging device. Said device can be formed by a hardware circuit, an analogue or a digital computer unit, in particular based on at least one operational amplifier, combinations thereof or the like.

In order to be able to achieve optimization of the intended operation, it can also be provided, from the method standpoint, that the two steps of the setting are repeated in an alternating manner. In this way, the greatest possible power transfer can be achieved with the greatest possible efficiency by iterative means. In this regard, the invention utilizes the property that the first capacitor preferably acts on the transferable power, whereas the second capacitor preferably influences the efficiency.

According to a further development, it is proposed that the repetition of the steps of setting is continued until a maximum value is reached for the efficiency or a pre-determined comparison value for the transferred power is reached. By this means it is possible for the setting process to be ended once one of the pre-determined aforementioned conditions is reached. The maximum value for the efficiency can be provided in that, even with further settings, no further increase in the efficiency can be achieved. The maximum possible efficiency is therefore achieved in this operating state. Alternatively, a pre-determined comparison value for the transferred power can be used in order to end the process of repeated setting. The pre-determined comparison value can therefore be dependent, for example, on how much time is available for the desired charging of the electrical energy storage device of the electrically powered vehicle. Furthermore, the comparison value can naturally also be dependent on further parameters, for example the maximum possible power rating of the charging device, of the electrical energy storage device of the electrically powered vehicle, and/or the like.

Naturally, a combination can also be provided wherein, for example, reaching the maximum value for the efficiency leads preferentially to the ending of the repetition of the setting steps as compared with reaching the pre-determined comparison value for the power transferred. This embodiment takes account of the arrangement wherein the pre-determined comparison value for the power transferred cannot be achieved. In this case, the repetition of the steps of setting is continued throughout the charging process. In order to prevent this, the achievement of a maximum value for the efficiency level can be used as the criterion for the ending.

Accordingly, the invention also includes a computer program product of the generic type, wherein the product has program code segments of a program for carrying out the method according to the invention when the program is executed by the computer unit of the control device. The aforementioned computer program product can be configured as a computer-readable storage medium. Furthermore, the program can be loadable directly into an internal memory of the computer unit. It is, for example, possible to download the program from a network out of a data source, for example, a server and into an internal memory of the computer unit, so that the computer can execute the program.

Preferably, the computer program comprises a computer-readable medium on which the program code segments are stored. A computer-readable medium of this type can be, for example, a memory chip, a compact disk, a USB stick or the like.

Other features which are considered as characteristic for the invention are set forth in the appended claims.

Although the invention is illustrated and described herein as embodied in a method and device for charging an electrical energy storage device of an electrically powered vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
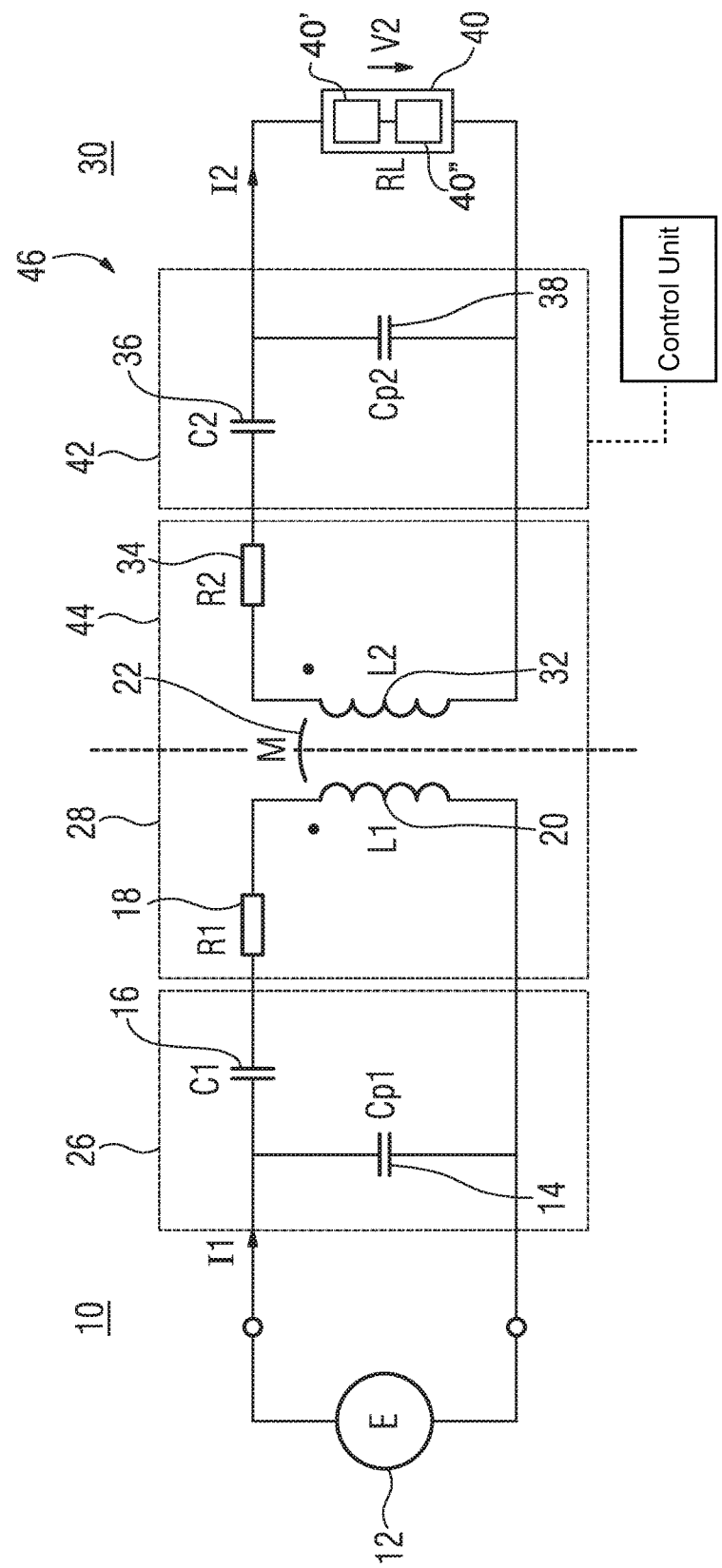
FIG. 1 is a schematic illustration of a circuit diagram showing the principle of a wireless inductive energy transfer path with a charging station and an electrically powered vehicle.

Referring now to the figures of the drawing in detail and first, particularly, to FIG. 1 thereof, there is shown an illustration of the charging principle, with a current supply site 10 as a charging station in charging operation with an electrically powered vehicle 30. A dashed vertical midline in FIG. 1 represents the separation of the current supply site-side elements and the vehicle-side elements.

The schematic circuit diagram of FIG. 1 represents only the elements of a current supply site 10 and an electrically powered vehicle 30 connected thereto which are effective for the underlying principle. The left-hand half of the figure therefore shows the elements belonging to the current supply site 10, whereas the right-hand half shows the vehicle-side elements.

The current supply site 10, or charging station 10, on the left in FIG. 1 comprises an energy source (E) 12 which is connected to a compensating circuit 26. The energy source does not necessarily need to be a component of the current supply site 10, but can also be an external apparatus which is connected to a connection of the current supply site 10 provided for this purpose. The compensating circuit 26 is connected to a coil circuit 28. The energy source 12 supplies electrical energy with an alternating voltage which is fed via the compensating circuit 26 of the coil circuit 28. The coil circuit 28 consists of a series connection of a resistor 18, identified in FIG. 1 as R1, and a coil 20, identified in FIG. 1 as L1. The resistor 18 represents current supply site-side losses grouped together. The coil 20 generates, due to the alternating voltage applied thereto and the resulting current flow, an alternating magnetic field 22 which serves for wireless energy-transferring coupling, that is, the inductive transfer of energy.

The compensating circuit 26 has a capacitor 16 which is identified in FIG. 1 as C1 and which is connected in series with the coil circuit 28. Connected in parallel with the aforementioned series circuit is a second capacitor 14 which is identified in FIG. 1 as Cp1. The compensating circuit 26 serves to adapt the energy source 12 to the coil circuit 28 so that the most favorable possible generation of the magnetic field 22 can be achieved.

On the vehicle side, a charging device 46 is provided which is connected to an electrical load 40 which is identified in FIG. 1 as RL. The illustration of the electrical load 40 represents a grouping of the loads supplied with electrical energy by the charging device 46, for example, an accumulator forming the electrical energy storage device 40' and an electric machine 40" of a drive apparatus of the electrically powered vehicle 30.

The charging device 46 has a coil circuit 44 which comprises a series connection of a coil 32 and an electrical resistor 34 which is identified in FIG. 1 as R2. The electrical resistor 32 is intended to represent losses. The coil 32 is exposed to the magnetic field 22 and accordingly generates an alternating voltage which is made available to the load 40 via a compensating circuit 42 connected to the coil circuit 44. What is not shown is that a corresponding adaptation of the alternating voltage generated by the coil 32 is undertaken so that it is suitable for the proper operation of the loads. For example, in this regard, rectification can be provided.

The compensating circuit 42 has a first capacitor 36 which is identified in FIG. 1 as C2. The first capacitor 36 is settable with regard to the capacitance thereof and is connected in series with the coil circuit 44. The compensating circuit 42 also has a second capacitor 38 which is identified in FIG. 1 as Cp2. The second capacitor 38 is connected in parallel with the aforementioned series circuit. The second capacitor 38 is also configured settable.

The first and second capacitor 36, 38 are configured in multiple parts, wherein the individual capacitor parts can be activated or deactivated by means of switching elements (which are not shown). In this way, the capacitance of the first and second capacitors 36, 38 is settable. The charging device 46 therefore serves for the wireless transfer of energy by means of the alternating magnetic field 22. Accordingly, the compensating circuit 42 is settable.

The method for operating the charging device 46 of the electrically powered vehicle 30 uses the energy provided by means of the alternating magnetic field 22, for which purpose the energy provided by the alternating magnetic field 22 is received by means of the electronic coil 32 interacting with the alternating magnetic field 22 and is fed to the electric load 40 in the form of electrical energy.

Figure 2:
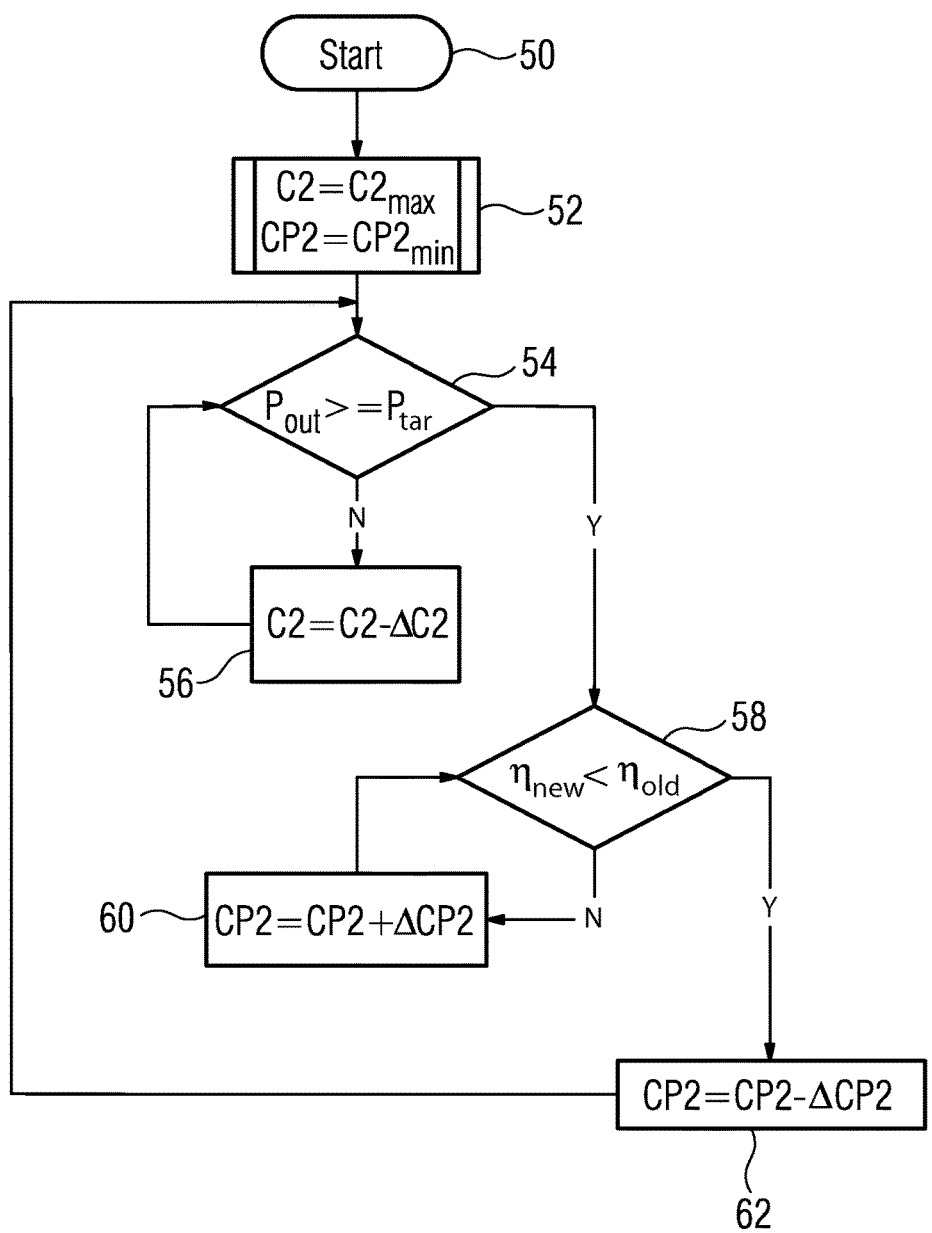
FIG. 2 is a schematic illustration showing a flow chart for a computer unit of a control device of the electrically powered vehicle for setting the compensating circuit.

FIG. 2 shows a schematic flow diagram for carrying out a method according to the invention. The method sequence begins with the start at 50. In step 52, a control device of the charging device 46 sets the first capacitor 36 of the compensating circuit 42 to the maximum possible value. At the same time, the second capacitor 38 is set to its smallest possible value. Furthermore, a comparison value for a power $P_{target}$ (or, $P_{setpoint}$) of approximately 3.3 kW is pre-determined and an initial value for the efficiency is set to zero.

Once these settings have been made in step 52, there follows in step 54 a comparison of an actually measured power with the comparison value for the power $P_{target}$. If the actually measured power does not reach the comparison value $P_{target}$, the method is continued in step 56 in that the first capacitor 36 is reduced by a pre-determined amount, for example, by one part of a multi-part capacitor. The method is then continued in step 54 until the measured power reaches the comparison value $P_{target}$. As soon as the comparison value $P_{target}$ has been reached, the method is continued in step 58.

In step 58, a comparison of the determined efficiency levels is carried out. The efficiency levels can be determined, for example, by means of a computer unit (not shown) of the control device. The method begins with an initial efficiency level of 0 percent. In step 58, a newly determined efficiency level is compared with a previous efficiency level. If the new efficiency level $\eta_{new}$ is lower than the previous efficiency level $\eta_{old}$, the method is continued at step 60 and a capacitance value of the second capacitor 38 is increased by a partial amount. A new efficiency level is then determined and the previous new efficiency level is redefined as the previous efficiency level. The comparison in step 58 is then carried out again. This loop repeats until the new efficiency level $\eta_{new}$ is greater than or equal to the previous efficiency level $\eta_{old}$. As soon as this is achieved, the method sequence branches to step 62 where a reduction in the value of the capacitance of the second capacitor 38 by a predetermined partial amount is carried out. The method then continues with the determination of the actual power and the comparison in step 54.

It is not provided herein that the method sequence comes to an end. However, condition criteria can be pre-determined which provide for the ending of the execution of the method.

Figure 3:
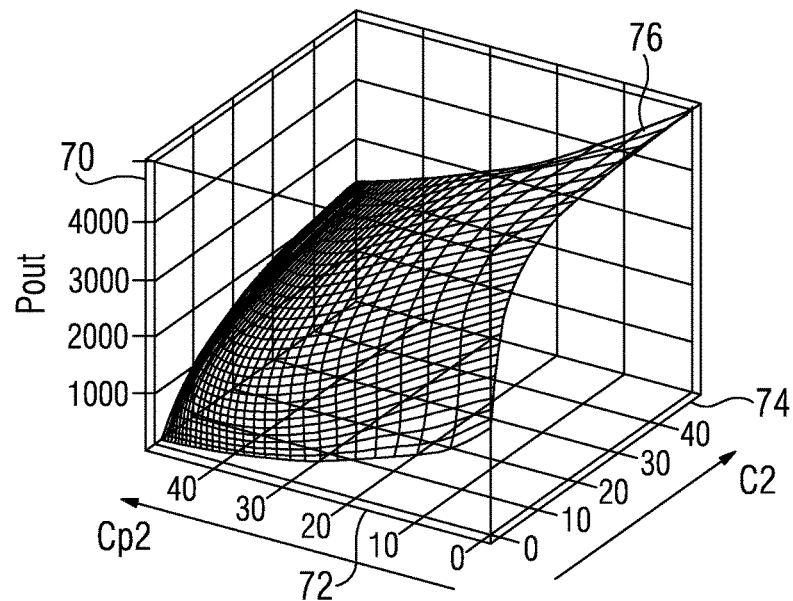
FIG. 3 is a schematic representation with a three-dimensional diagram showing, by means of a graph in one plane the dependency of the transferred power on a first and a second capacitor of a compensating circuit.
Figure 4:
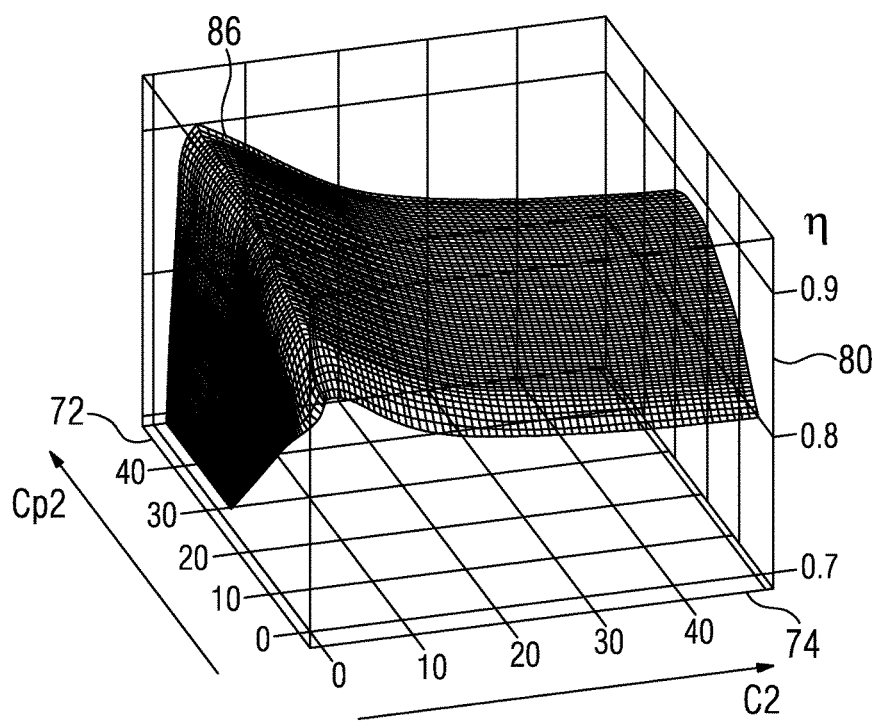
FIG. 4 is a schematic representation with a three-dimensional diagram showing, by means of a graph, a dependency of an efficiency of the power transfer on the first and second capacitor of the compensating circuit of FIG. 1.

FIGS. 3 and 4 show the dependencies of the power and the efficiency level on the first and second capacitors 36, 38.

FIG. 3 shows a three-dimensional diagram in a schematic representation with a plane as the graph 76. Shown on the first axis 72 is the capacitance of the second capacitor 38 and on the second axis 74, the capacitance of the first capacitor 36. On a third, vertical axis, the output power is shown in W.

The values for the first and second capacitor 36, 38 on the axes 72, 74 are purely exemplary, in order to illustrate the invention.

FIG. 4 shows a three-dimensional diagram comparable to that of FIG. 3, wherein the first and second axes 72, 74 are shown as in FIG. 3 and therefore correspond thereto. However, the vertical axis 80 shows values for the efficiency η.

The preceding exemplary embodiment is intended merely to illustrate and not to restrict the invention. Naturally, a person skilled in the art would provide suitable variations as needed without departing from the central concept of the invention.

Naturally, individual features can be combined with one another in any required manner as needed. Furthermore, device features can naturally also be disclosed through corresponding method steps and vice versa.

The invention claimed is:

1. An electrically powered vehicle, comprising:
   a drive apparatus having an electric machine and an electrical energy storage device connected to said electric machine;
   a charging device connected to said electrical energy storage device for a wireless transfer of energy by way of an alternating magnetic field, said charging device having an electronic coil configured to interact with the alternating magnetic field; and
   a settable compensating circuit connected to said electronic coil, said compensating circuit including an adjustable first capacitor having an adjustable capacitance connected to form with said electronic coil a series circuit, and an adjustable second capacitor having an adjustable capacitance connected in parallel with said series circuit formed of said electronic coil and said first capacitor; and
   a control device connected to said compensating circuit and configured for adjusting said first capacitor to maximize a power level of a charging operation and for subsequently adjusting said second capacitor to maximize an efficiency of the charging operation.

2. The vehicle according to claim 1, wherein said control device is configured for setting said compensating circuit in dependence on one or both of a power level transferred by way of the alternating magnetic field and an efficiency level of the energy transfer.

3. The vehicle according to claim 1, wherein said control device is configured to adjust said first capacitor by reducing a capacitance of said first capacitor in steps until a pre-determined comparison value is reached and to subsequently adjust said second capacitor by increasing a capacitance of said second capacitor until a maximum value for the efficiency level is reached.

4. A method of operating a charging device of an electrically powered vehicle, the vehicle having a drive apparatus with an electric machine and an electrical energy storage device connected to the electric machine, the method comprising:

receiving with the charging device energy from an alternating magnetic field by way of an electronic coil disposed to interact with the alternating magnetic field and to feed the energy to the electrical energy storage device in the form of electrical energy;
setting the charging device with a settable compensating circuit connected to the electronic coil and controlled by a control device by the following steps:
   setting a power transferred to the charging device by the alternating magnetic field by adjusting a capacitance of a first adjustable capacitor of the compensating circuit connected in series with the electronic coil;
   continuing the step of setting the power until a pre-determined comparison value for the transferred power is reached; and
   subsequently setting an efficiency level in relation to a power transferred by adjusting a capacitance of a second adjustable capacitor of the compensating circuit connected in parallel with a series connection formed of the electronic coil and the first capacitor; and
   continuing the step of setting the efficiency level until a maximum value for the efficiency level is reached.

5. The method according to claim 4, which comprises alternately repeating the step of setting the power and the step of setting the efficiency level.

6. A computer program product, comprising a non-transitory program for a computer unit of a charging device, wherein the program comprises non-transitory program code segments of a program for carrying out the method according to claim 4 when the program is carried out by the computer unit.

7. The computer program product according to claim 6, wherein the computer program product comprises a computer-readable medium on which the program code segments are stored in non-transitory form.

8. The computer program product according to claim 6, wherein the program is loadable directly into an internal memory of the computer unit.

9. The method according to claim 4, wherein:
   the step of setting a power transferred to the charging device comprises lowering the capacitance of the first adjustable capacitor in steps and repeating the steps until the pre-determined comparison value for the transferred power is reached; and
   the step of setting the efficiency level comprises raising the capacitance of the second capacitor in steps and repeating the steps until the maximum value for the efficiency level is reached.

* * * * *